US009415665B2

(12) United States Patent
Nellen

(10) Patent No.: US 9,415,665 B2
(45) Date of Patent: Aug. 16, 2016

(54) OPEN ROOF CONSTRUCTION FOR A VEHICLE

(71) Applicant: Inalfa Roof Systems Group B.V., Venray (NL)

(72) Inventor: Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 14/719,690

(22) Filed: May 22, 2015

(65) Prior Publication Data

US 2015/0336448 A1 Nov. 26, 2015

(30) Foreign Application Priority Data

May 23, 2014 (EP) .................................... 14169601

(51) Int. Cl.
*B60J 7/057* (2006.01)
*B60J 7/043* (2006.01)
*B60J 7/047* (2006.01)
*B60J 7/02* (2006.01)

(52) U.S. Cl.
CPC  *B60J 7/043* (2013.01); *B60J 7/024* (2013.01); *B60J 7/047* (2013.01); *B60J 7/0435* (2013.01); *B60J 7/0573* (2013.01)

(58) Field of Classification Search
CPC ........... B60J 7/0435; B60J 7/047; B60J 7/057
USPC ............................. 296/216.02–216.05, 220, 1
See application file for complete search history.

(56) References Cited

U.S. PATENT DOCUMENTS

| 4,685,724 A | 8/1987 | Niwa |
| 4,690,452 A | 9/1987 | Niwa |
| 4,690,453 A | 9/1987 | Niwa |
| 4,730,868 A | 3/1988 | Niwa |
| 4,911,497 A | 3/1990 | Schreiter et al. |

(Continued)

FOREIGN PATENT DOCUMENTS

| DE | 19851366 | 5/1999 |
| EP | 0331910 | 9/1989 |

(Continued)

OTHER PUBLICATIONS

Communication from corresponding foreign application 14169601.3 filed May 23, 2014, dated Sep. 8, 2014.

*Primary Examiner* — Dennis H Pedder
(74) *Attorney, Agent, or Firm* — Steven Koehler; Westman, Champlin & Koehler

(57) ABSTRACT

An open roof construction for a vehicle comprises a stationary part and at least one closure element. A rear guide track is mounted at least substantially rearward of a roof opening. The closure element is supported by a rear support including a lifting device and a guiding device for engagement in said rear guide track upon rearward movement of the closure element. The lifting device includes a height-adjustable, movable element. The lifting device is movably connected to the stationary part and includes a guide track for the guiding device that is connected to the closure element, which guide track of the lifting device connects to the rear guide track during at least a part of the rearward movement of the closure element to allow the guiding device thereof to move between the guide track of the lifting device and the rear guide track.

15 Claims, 8 Drawing Sheets

(56) References Cited

U.S. PATENT DOCUMENTS

| | | |
|---|---|---|
| 6,129,413 A | 10/2000 | Klein |
| 6,158,803 A | 12/2000 | Reihl et al. |
| 6,390,545 B1 | 5/2002 | Makino et al. |
| 6,527,337 B2 | 3/2003 | Farber |
| 6,568,750 B2 | 5/2003 | Radmanic |
| 6,652,022 B2 | 11/2003 | Pfalzgraf et al. |
| 6,942,285 B2 | 9/2005 | Manders |
| 8,136,872 B2 | 3/2012 | Nellen |
| 8,870,276 B2 | 10/2014 | Geurts et al. |
| 8,991,911 B2 | 3/2015 | Nabuurs et al. |
| 2005/0021870 A1 | 1/2005 | Carnahan |
| 2005/0218704 A1 | 10/2005 | Uehara |
| 2009/0039682 A1 | 2/2009 | Ito et al. |
| 2009/0072589 A1 | 3/2009 | Ito et al. |
| 2013/0161983 A1 | 6/2013 | Geurts et al. |
| 2014/0175840 A1 | 6/2014 | Nabuurs et al. |

FOREIGN PATENT DOCUMENTS

| | | |
|---|---|---|
| EP | 1314600 | 5/2003 |
| EP | 1741588 | 1/2007 |
| EP | 2028031 | 2/2009 |
| EP | 2727755 | 5/2014 |
| JP | 59156820 | 9/1984 |
| WO | 2008049407 | 5/2008 |
| WO | 2009109219 | 9/2009 |

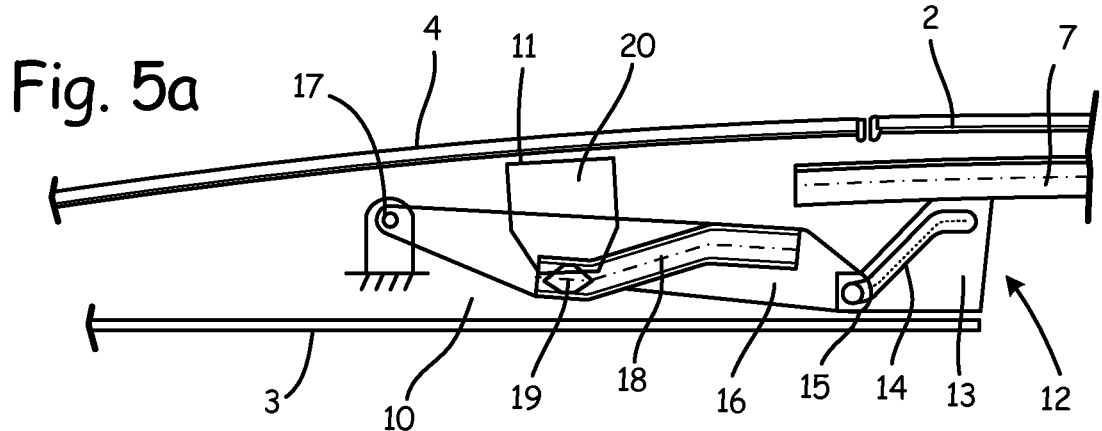
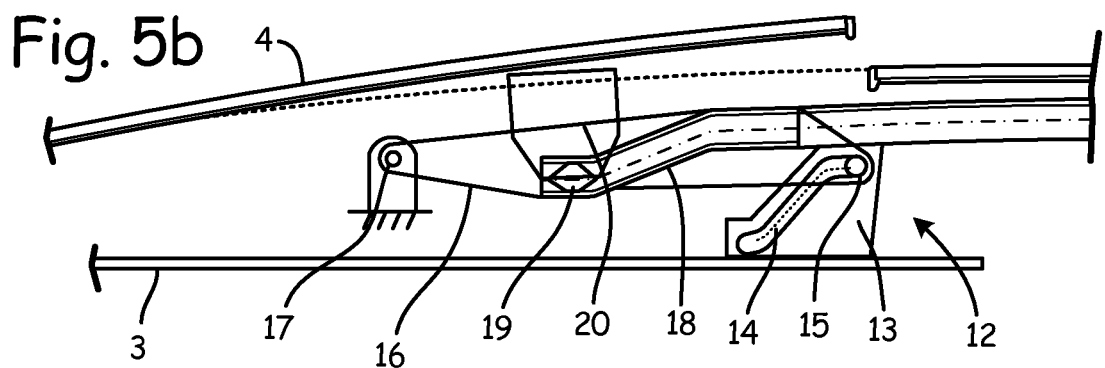
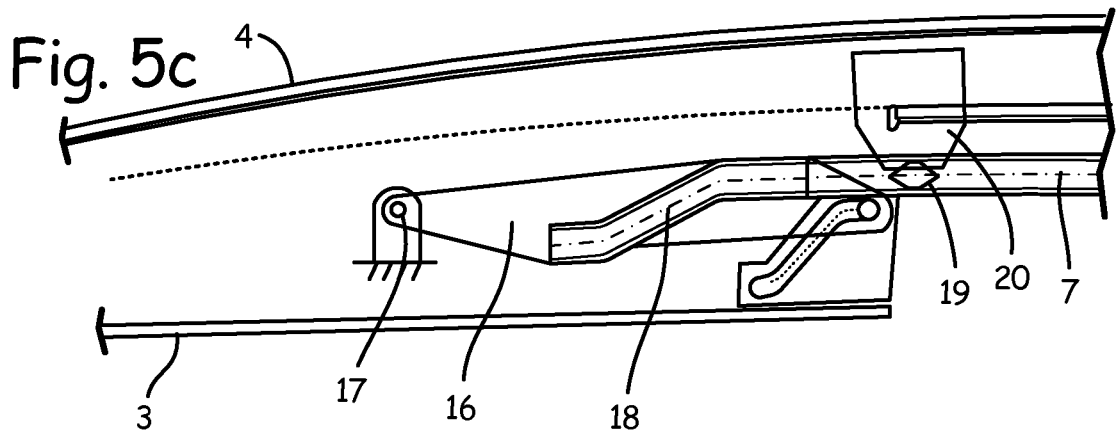

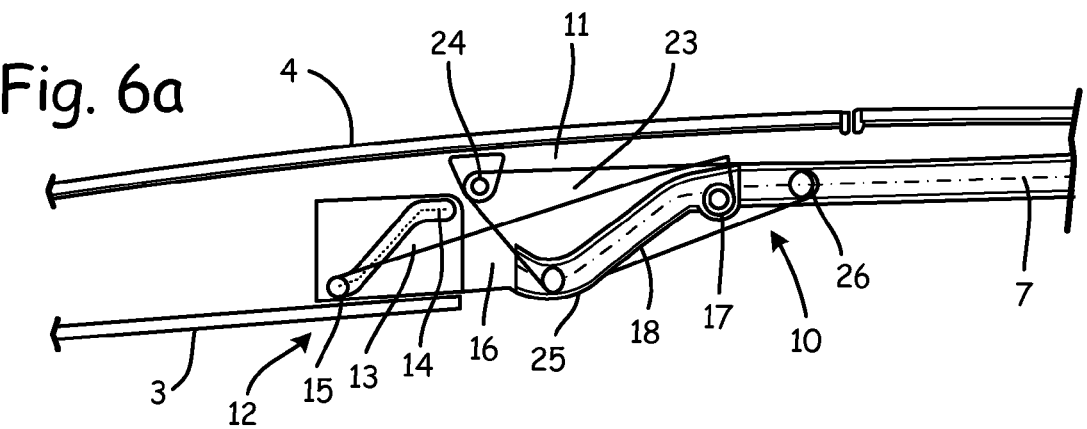
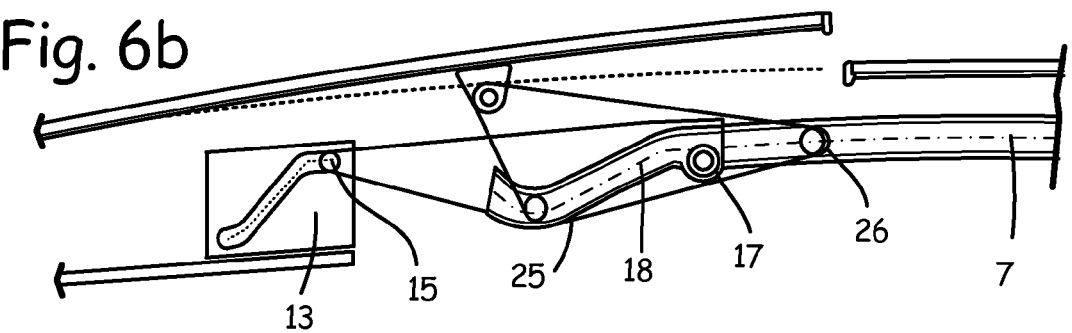
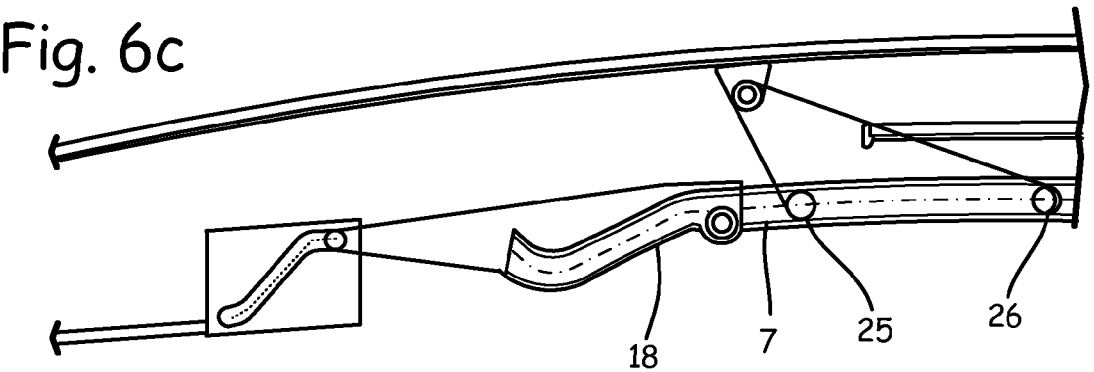

OPEN ROOF CONSTRUCTION FOR A VEHICLE

BACKGROUND

The discussion below is merely provided for general background information and is not intended to be used as an aid in determining the scope of the claimed subject matter.

In an open roof construction a lifting device and a guiding device are integrated and include a pivotable lever which pivots when it acts as the lifting device and slides when it acts as guiding device. To pivot the lever, there is provided a slide including a guide slot engaged by a guide pin of the lever. The guide pin exits and enters the guide slot when changing from lifting device to guiding device and back. At the same time a guide member of the guiding device should enter and exit the rear guide track, respectively. This creates a take-over point which might cause problems.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. It is one of the objects of the invention to improve the prior art roof assembly.

According to a first aspect of the open roof construction, the lifting device is movably connected to the stationary part and includes a guide track for the guiding device that is connected to the closure element, which guide track of the lifting device connects to the rear guide track during at least a part of the rearward movement of the closure element to allow the guiding device thereof to move between the guide track of the lifting device and the rear guide track.

Now that the guiding device is continuously in engagement with one of the guide tracks and these guide tracks are connected to each other at least temporarily, a take-over point as in the prior art is avoided In one embodiment, the forcing mechanism includes a guiding slide which is provided with a guide curve to be engaged by a guide member connected to the lifting device.

Such forcing mechanism is simple and reliable.

The lifting device may be rotatably connected to the rear guide track.

Connecting the lifting device to the rear guide track reduces tolerance problems, and thus ensures that the guide tracks precisely align to each other to allow a smooth transfer of the guiding device from one guide track to the other.

An axis of rotation of the lifting device may be arranged substantially at a front end of the rear guide track.

In this case the movement of the lifting device at the front end of the rear guide track is minimal which also enables in a simple manner a precise connection/alignment between the guide tracks.

In another embodiment, the lifting device is rotatable around an axis of rotation which is positioned remote from a front end of the rear guide track.

In such embodiment it might be easier to obtain a connection between the guiding device and the closure element which is closer to the rear side of the closure element which promotes stability. It might also enable a higher lifting of the closure element and/or a smaller vertical package of the rear support in closed position of the closure element.

The guide track in the lifting device may extend rearwardly and upwardly, also in a position when the guide track connects to the rear guide track.

Such extent of the guide track in the lifting device creates an additional lifting movement so that the required vertical movement of the lifting device could be relatively small.

In an embodiment, the front and rear supports of the closure element are driven such that the closure element is moved from the closed position in a first movement to a venting position by mainly a pivoting movement around a pivoting axis near the front support of the closure element, and in a second movement to an open position above the roof area be-hind the roof opening, the first movement being initiated by the forcing mechanism, the second movement by the front support.

This enables a separation of movements without requiring switches in the rear support for the closure element. The switches may now be provided in the drive.

In a simple embodiment, the guiding device is a bracket fixed to the closure element and including a guide member engaging the guide tracks.

In another embodiment, the guiding device is a lever which is pivotally connected to the closure element and includes at least one guide member engaging the guide tracks.

Such embodiment including a lever is more complex, but might enable a smaller package of the rear support in the closed position of the closure element, or enable a higher lift of the closure element.

According to another aspect, at least the forcing mechanism, the guiding device, and the rear guide track are arranged such with respect to each other that they are substantially in the same lateral position.

Such arrangement reduces the width or package of the rear support, and still enables the required movements of the closure element. In particular, this arrangement means that parts are not positioned beside each other, but one at least partially and in particular at least substantially behind or below at least one of the others.

If the guide track in the lifting device and the rear guide track include an opening in upward direction, and the guiding device having a width which is more narrow than the width of the opening at least at the position of the opening, it is also possible to arrange the lifting device and the guiding device in substantially the same lateral position.

The forcing guide may be positioned mainly below the rear guide track, allowing these elements to be substantially in the same lateral position.

BRIEF DESCRIPTION OF THE DRAWINGS

Further details and advantages of aspects of the invention follow from the below description with reference to the drawings schematically showing embodiments of the open roof construction by way of example.

FIG. 4 is a plan view of FIG. 3a.

FIGS. 5a, b, c-FIGS. 9a, b, c are views corresponding to those of FIGS. 3a, b, c but showing other embodiments of the open roof construction.

DETAILED DESCRIPTION OF THE ILLUSTRATIVE EMBODIMENTS

In the various embodiments, similar parts are indicated by the same reference numbers.

Figure 1:
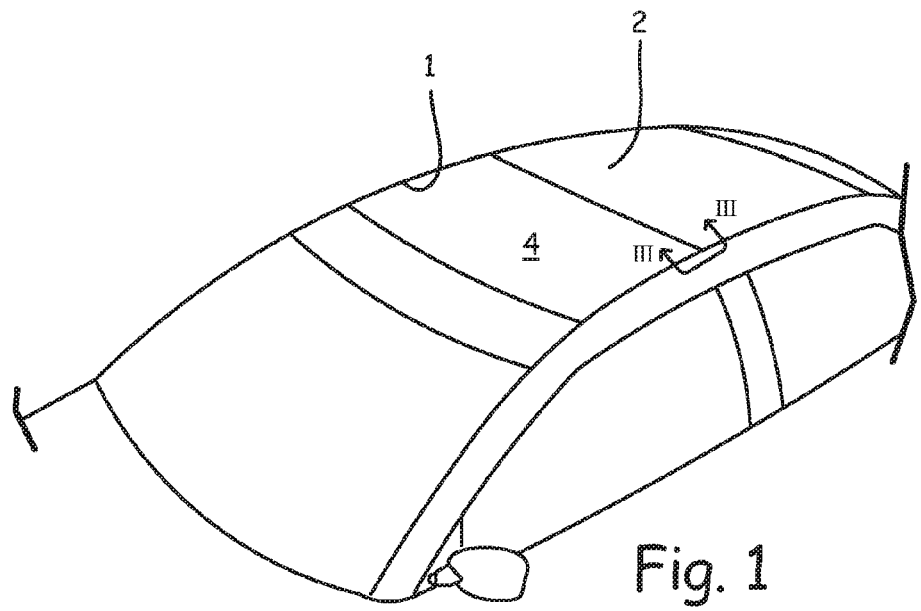
FIG. 1 is a perspective view of a part of a vehicle equipped with the open roof construction, showing the closure element in its closed position.
Figure 2:
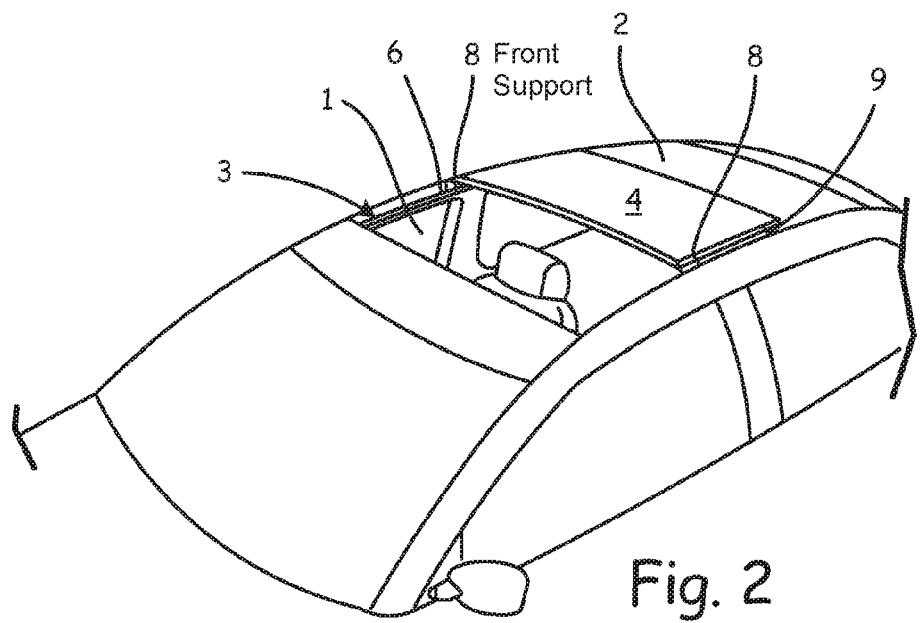
FIG. 2 is a view corresponding to that of FIG. 1 but showing the closure element in its opened position.

The drawings show an embodiment of an open roof construction for a vehicle, in particular a motor vehicle such as a passenger car. As is shown in FIGS. 1, 2 this vehicle is provided with an opening 1 in its fixed roof 2, whereby it is noted that said fixed roof 2 may either form part of the vehicle or of the open roof construction itself, which in that case makes up the entire roof of the vehicle. The fixed roof 2 may consist of an integral part of the vehicle or of one or more (transparent) panels, which may be removable or form a separate adjustable roof element.

The open roof construction comprises a stationary part, such as a frame 3 (FIG. 2), and a closure element, in this case in the form of a rigid and preferably transparent panel 4, for example made of glass or of plastic material, which is movably supported by frame 3. In this embodiment, panel 4 is movable between a closed position, in which roof opening 1 is closed and panel 4 is at least substantially coplanar with the fixed roof 2, and an open position, in which panel 4 occupies a rearward position, at least partially above fixed roof 2, in which a very large part of opening 1 is cleared.

An adjusting mechanism is provided on each longitudinal side of panel 4 for effecting the movements of panel 4. The mechanism is driven by a driving unit including a driving element, such as a driving cable 5 (FIG. 3) and a manual actuator, such as a crank, or a motor such as an electric motor, for driving the cable (not shown). The mechanism supports panel 4 and is at least partially guided in a front guide track 6, which forms part of or is mounted on frame 3. The front guide track 6 extends along the side edge of roof opening 1, at a lower level than fixed roof 2. However, it is very well possible that there is only one front guide track extending centrally below the roof opening 1.

Furthermore, a rear guide track 7 is provided, namely at, and in this case just below, the fixed roof, substantially rearward of the roof opening 1 and in this case rearward of front guide track 6 and on both lateral sides of the fixed roof. The drawings show only parts on one side of the roof, but it should be kept in mind that similar parts are arranged in mirror image on the other side as well.

Figure 3A:
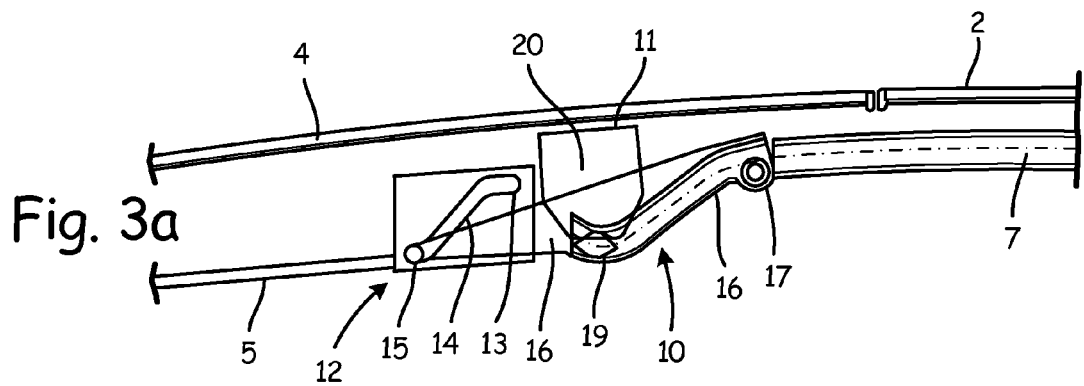
FIG. 3a is an enlarged sectional view according to the line III-III in FIG. 1.
Figure 3B:
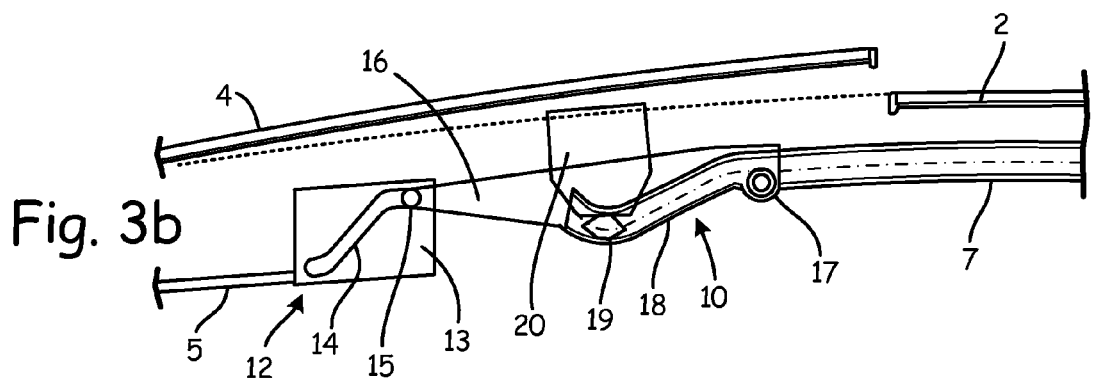
FIGS. 3b, 3c are views corresponding to that in FIG. 3a, but showing the closure element in its venting and opened positions, respectively.
Figure 3C:
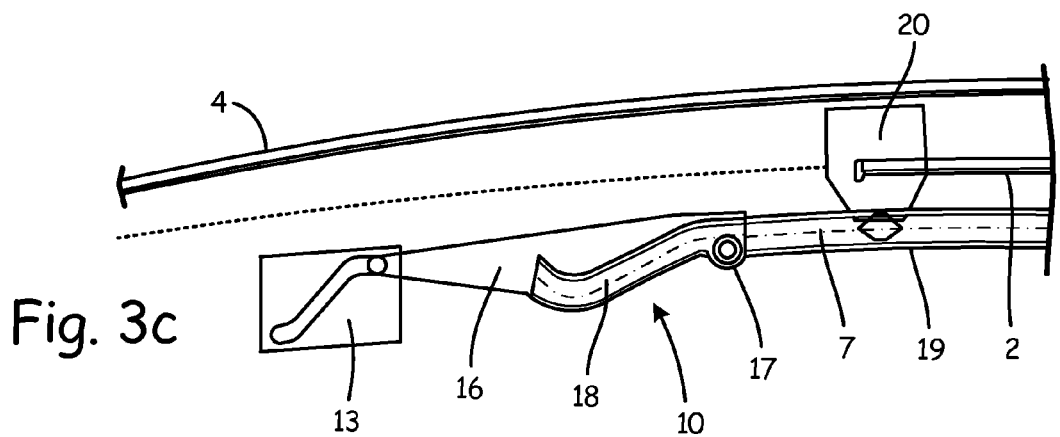
Figure 4:
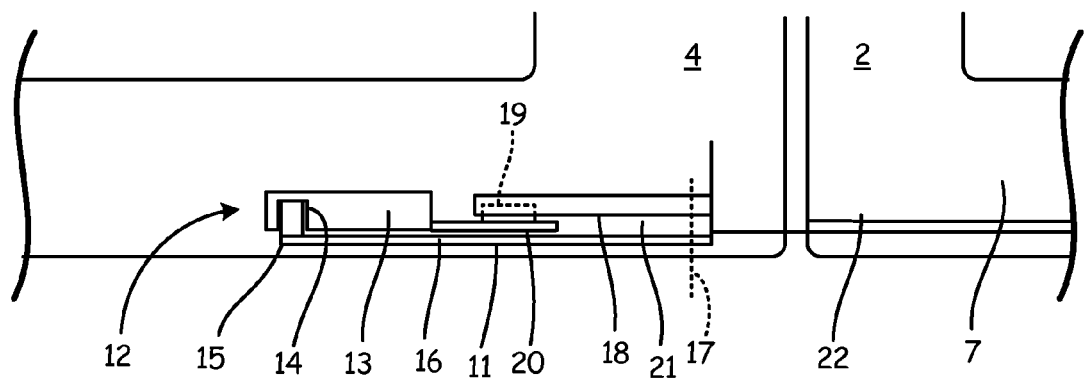

As is shown in FIGS. 2, 3 and 4, the adjusting mechanism for panel 4 includes a front support 8 and a rear support 9. The front support 8 is in engagement with a driving slide (not shown) which is guided in front guide track 6 and forms part of the driving unit of adjusting mechanism. The driving cable 5 is connected to a driving slide. The front support 8 may be constructed as in EP 2 727 755, the contents of which are incorporated herein by reference thereto. The structure of the front support 8 does not form part of the present invention and could be constructed in any way. It would also be possible that the sliding movement of panel 4 is initiated not through the front support 8, but in another way.

The rear support 9 includes a lifting device 10, a guiding device 11 and a forcing mechanism 12.

The forcing mechanism 12 includes a guiding slide 13 having a guide track or slot 14 in which a guide member or pin 15 of the lifting device 10 engages. Slot 14 extends rearwardly and upwardly and has substantially horizontal portions at its ends. In the embodiments shown, the guiding slide 13 moves forwardly when panel 4 is moved from the closed to the venting position. This may be accomplished by a separate driving cable, but it is also possible to temporarily couple the back end of driving cable 5 (as shown) to guiding slide 13, so that the slide 13 is driven in a direction opposite to the sliding movement of panel 4 that follows if the actuation of the drive unit is continued.

The lifting device 10 includes a rotatable element 16 which is rotatable around an axis of rotation 17 which is positioned at the front end of the rear guide track 7. Preferably, the axis is formed by an element such as a pin that is supported by the rear guide track 7, so that there are no aligning problems between the lifting device 10 and the rear guide track 7. This is relevant as the rotatable element 16 of the lifting device 10 includes a guide track 18 that should connect to the rear guide track 7 in one rotational position of the rotatable element 14 so as to form one continuous guide track.

The guide tracks 7 and 18 are intended to guide a guide member or cam 19 which is fixed to the guiding device 11, here formed as a simple bracket 20 fixed to panel 4. The guide track 18 has a light S-shape with a lower portion accommodating guide cam 19 when panel 4 is in its closed position (providing stability in vertical direction), a middle portion which is rearwardly and upwardly inclined to add lift to panel 4 when guide cam 19 moves through this portion, and an upper portion which is in line with rear guide track 7 when the guide track 18 connects thereto.

As is shown in FIG. 4, lifting device 10, guiding device 11 and forcing mechanism 12 are shaped and arranged to form a small packing in lateral (Y) direction. In this embodiment, this is accomplished by arranging guiding slide 13, bracket 20 and rear guide track 7 behind each other so that they can be arranged in substantially the same lateral position. The guide track 18 of lifting device 10 is also positioned in line with rear guide track 7. It includes a vertical opening 21 along its length so that bracket 20 of the lifting device 10 (which is of a small width) can extend vertically through opening 21 and can thus be positioned above a part of the guide track 18 and does not protrude in lateral direction. The rotatable element 16, to which guide track 18 is attached or formed, is made of thin sheet-like material, such as steel, and is positioned close to guiding slide 13 so as to add only little width to the rear support 9.

The rear guide track 7 also has a vertical opening or slit 22 to allow bracket 20 of the guiding device 11 to pass through. In case the rear guide track 7 is positioned below (the plane of) fixed roof 1, it should also have some kind of passage for bracket 20. The rear guide track 7 could be made of one piece of material, or could e.g. have a separate front piece made of plastic and have an integrated axis of rotation for the rotatable element 16.

The operation of the open roof construction of FIGS. 3 and 4 will be explained with reference to FIGS. 3a-3c.

In FIG. 3a, panel 4 is in its closed position. Guiding slide 13 is in its rear position, and guide pin 15 is in the front bottom portion of slot 14, so that rotatable element 16 is in its downwardly rotated position. Guide cam 19 is in front bottom portion of guide track 18.

In FIG. 3b, guiding slide 13 is moved maximally forwardly so that guide pin 15 has arrived in rear top portion of slot 14, and rotatable element 16 is rotated to its maximally upward position. In this position, panel 4 is tilted to the venting position, and rotatable element 16 is maximally rotated about axis of rotation 17, so that guide track 18 is now in alignment with rear guide track 7.

In FIG. 3c it is shown that guiding slide 13 is kept stationary because guiding cable 5 has been uncoupled from guiding slide 13. Guide cable 5 has now been coupled to front support 8 to move panel 4 rearwardly. During this movement, guide cam 19 is moved first through guide track 18. Due to this movement through guide track 18 which extends rearwardly and upwardly, panel 4 is lifted some more during its rearward movement. When guide cam 19 arrives at the rear end of guide track 18 it is transferred to rear guide track 7 smoothly due to the correct alignment of both guide tracks 7, 18. Panel 4 may then be slid further rearwardly to its fully opened position.

The return movement of the panel 4 to the front, closed position will be effected in an opposite manner.

FIGS. 5a-5c show a second embodiment of the open roof construction. Lifting device 10, guiding device 11 and forcing mechanism 12 are shown again. Guiding device 11 is similar as in the first embodiment. The axis of rotation 17 of rotatable element 16 of lifting device 10 is however positioned at the end of rotatable element 16 which is remote from the rear guide track, i.e. at the front of rotatable element. Axis of rotation 17 is supported by frame 3 or an element fixed thereto.

Guiding slide 13 is now positioned at the rear end of rotatable element 16 and below rear guide track 7 (and might be guided by the lower side of rear guide track 7), so that guiding device 11, forcing mechanism 12 and rear guide track 7 can still be arranged in substantially the same lateral position.

The operation of this second embodiment is similar to that of FIGS. 3a-3c, as appears from FIGS. 5a-5c.

FIGS. 6a-6c show a third embodiment with a similar arrangement of parts as in FIGS. 3a-3c, however, guiding device 11 now comprises a tilting lever 23. It is pivotally coupled to panel 4 by an axis of rotation 24 and it carries two guide members or pins 25, 26, one of which (the front pin 25) is positioned in guide track 18 when panel 4 is in closed to venting position, and is positioned in rear guide track 7 when panel 4 is moved a distance rearwardly. Rear guide pin 26 is continuously in engagement with rear guide track 7. This rear guide pin 26 acts as axis of rotation for rotatable element 16 when it is rotated (from the position of FIG. 6a to that of FIG. 6b). As soon as both guide pins are within rear guide track 7, tilting lever 23 is not tiltable anymore and only follows the rear guide track 7. The tilting lever 23 either creates some additional lift of panel 4 or reduces the package height in closed position of the panel 4, compared to the fixed bracket 20.

Figure 7A:
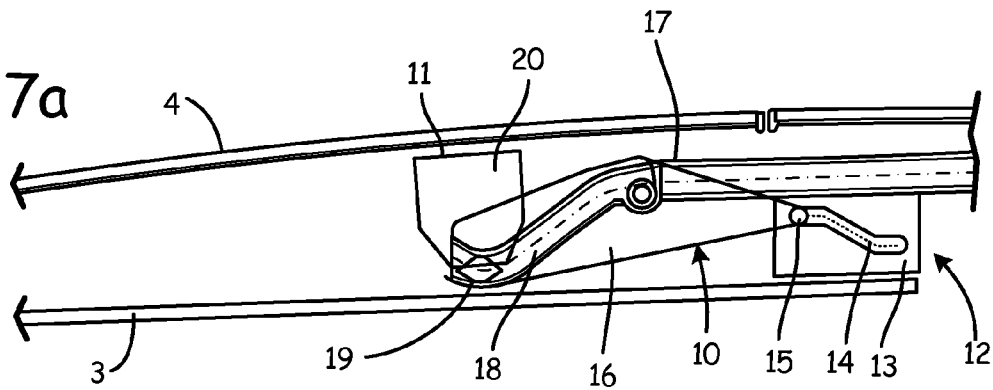
Figure 7B:
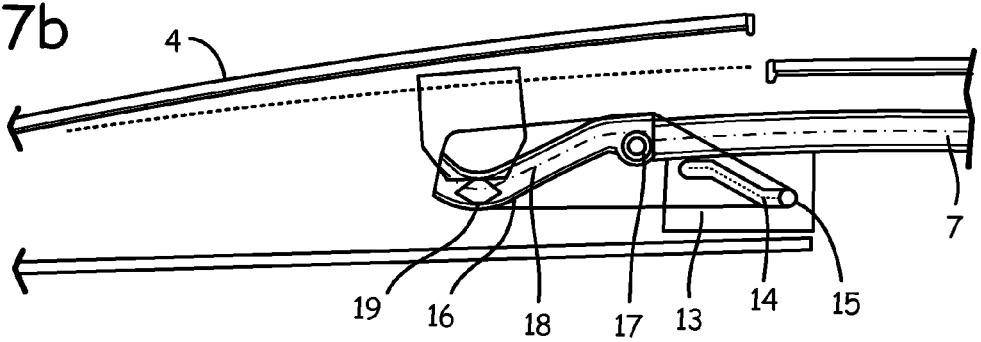
Figure 7C:
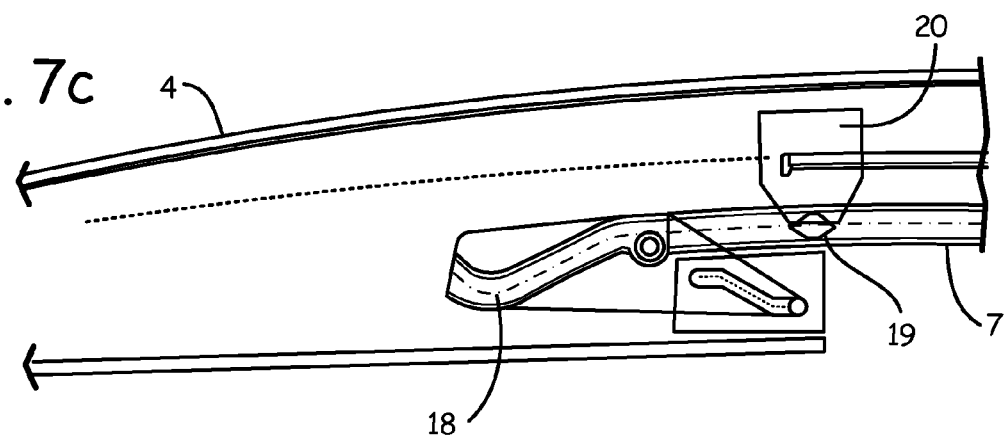

FIGS. 7a-7b show an embodiment which is a combination of that of FIGS. 3 and 4. The axis of rotation 17 is again position at the front end of rear guide track 7 (as in FIG. 3) and guiding slide 13 is again positioned at the rear end of lifting device 10 and below rear guide track 7. Rotatable element 16 is now a two-armed lever having a central axis of rotation 17. Due to the leverage action of the rotatable element, the height difference between the ends of slot 14 can be smaller to obtain the same lifting height of bracket 20 compared to the embodiment of FIG. 5.

Figure 8A:
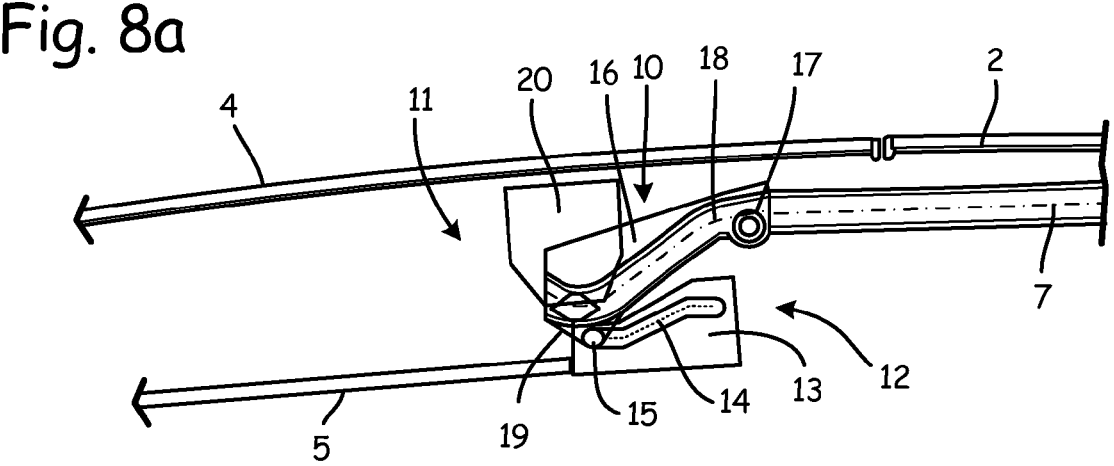
Figure 8B:
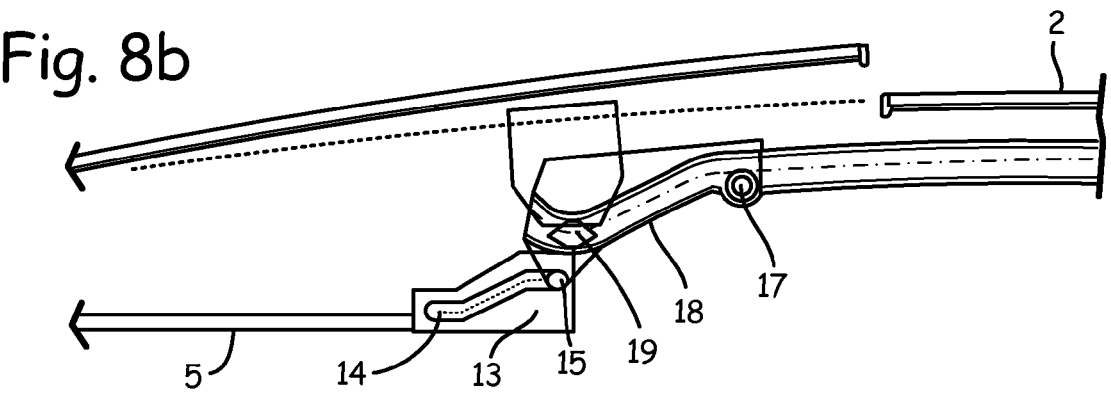
Figure 8C:
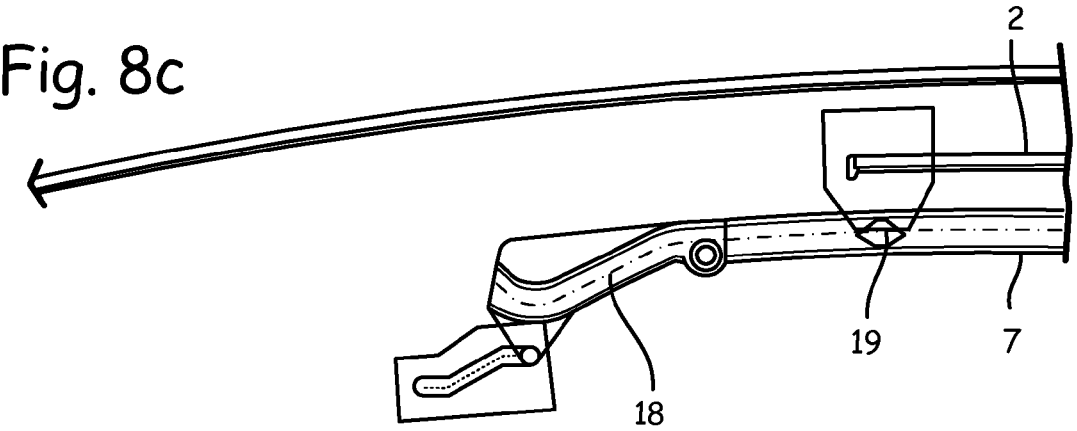

FIGS. 8a-8c show a further embodiment in which guiding slide 13 is arranged below and in the same lateral position as guide track 18 of lifting device 10. The height of slot 14 and guiding slide 13 could be less than in FIG. 3 as the lift of bracket 20 is now the same as the lift of guide pin 15. In this arrangement the package in lateral direction is again small. The slide 13 may support guide track 18 by means of its upper surface the shape of which is adapted to that of guide tyrack 18.

Figure 9A:
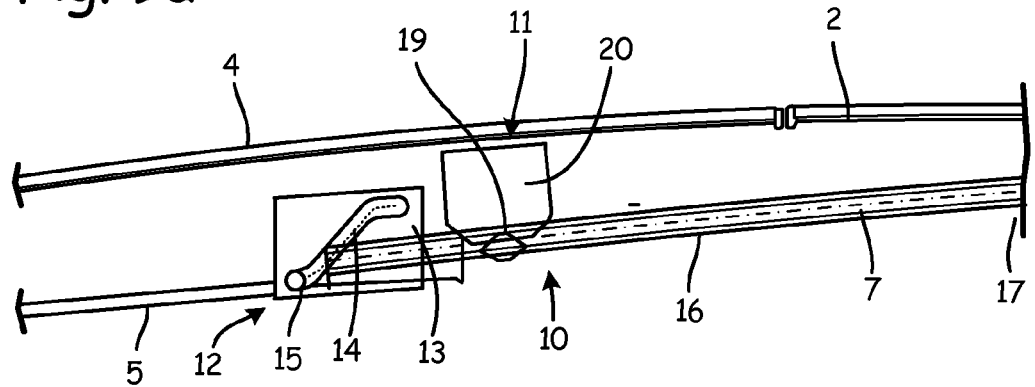
Figure 9B:
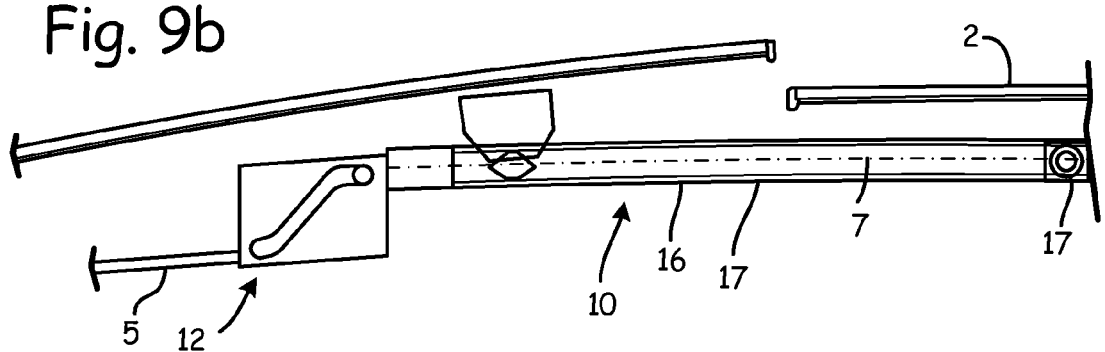
Figure 9C:
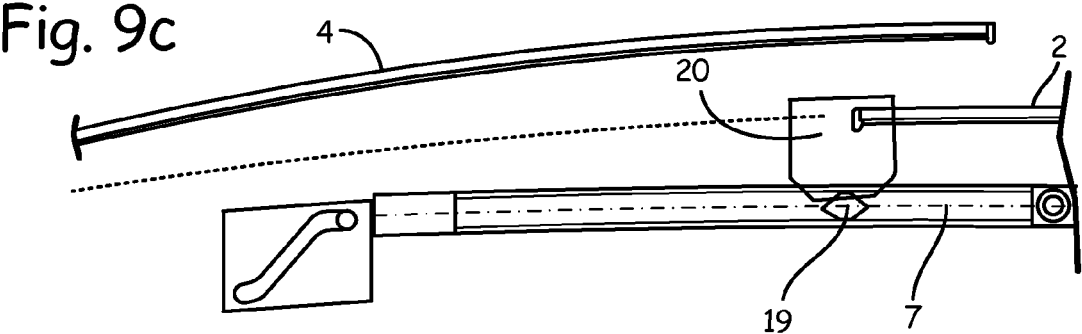

FIGS. 9a-9c show yet a further embodiment which is different in that the rear guide track now also functions as the lifting device. The axis of rotation 17 of lifting device 10 is now positioned at the rear end of rear guide track 7. Guide track 18 and rear guide track 7 are now integrated and guide cam 19 of bracket 20 of guiding device 11 is now continuously in engagement with rear guide track 7. Rear guide track 7, guiding device 11 and forcing mechanism are again arranged substantially in the same lateral position, so as to obtain a small lateral (Y) package of the rear support.

From the foregoing it will be clear that aspects of the invention provide a very simple, robust and reliable support and actuating mechanism for the closure element, and having a small package in lateral direction. It is noted that features of the various embodiments may be combined in different manners.

The invention is not restricted to the exemplary embodiment as described above and shown in the drawing, which can be varied in several ways without departing from the scope of the claims. For example, it is possible that the height-adjustable, movable element of the lifting device makes a sliding movement in vertical height, a combined sliding and rotating movement or other movements having a component in vertical direction. The positions of the members/pins/axes on the movable element can be varied depending on the desired moving mechanics, force distribution, package height etc. The coupling/locking element for coupling/uncoupling the driving cable and guiding slide may be separate elements, for example the coupling element on the driving slide and the locking element on the driving cable. It is also possible that the guiding slide is driven indirectly by the driving cable, or by a separate drive of the drive unit. The forcing mechanism may be provided with other elements to cause the lifting device to move in vertical direction.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. An open roof construction for a vehicle having an opening in its fixed roof, comprising:
   a stationary part having at least one front guide track extending at least along a part of the roof opening to be attached to the vehicle roof;
   at least one closure element which is movably supported by said stationary part and which is adjustable by a driving unit, wherein said closure element is movable between a closed position for closing the roof opening, and an open, rearward position for being at least partially above the roof area behind the roof opening, in which the roof opening is at least partially released, the closure element having a front support at a front side,
   the front support being connected to the front guide track for guided movement;
   a rear guide track mounted to the stationary part at least substantially rearward of the roof opening; and
   a rear support connected to the closure element at a rear side, the rear support including:
      a guiding device connected to the closure element, the guiding device configured to engage in said rear guide track upon rearward movement of the closure element;
      a lifting device coupled to the closure element and configured to lift a rear side of the closure element from its closed position, wherein the lifting device includes a guide track for the guiding device, and wherein the guide track of the lifting device is movable with respect to the rear guide track and aligns with the rear guide track during at least a part of the rearward movement of the closure element to allow the guiding device thereof to move between the guide track of the lifting device and the rear guide track; and a height-adjustable, movable element connected to the lifting device and having a forcing mechanism configured to determine a position of the lifting device.

2. An open roof construction for a vehicle having an opening in its fixed roof, comprising:

a stationary part having at least one front guide track extending at least along a part of the roof opening to be attached to the vehicle roof;

at least one closure element which is movably supported by said stationary part and which is adjustable by a driving unit, wherein said closure element is movable between a closed position for closing the roof opening, and an open, rearward position for being at least partially above the roof area behind the roof opening, in which the roof opening is at least partially released, the closure element having a front support at a front side, the front support being connected to the front guide track for guided movement;

a rear guide track mounted to the stationary part at least substantially rearward of the roof opening; and a rear support connected to the closure element at a rear side, the rear support including:

a guiding device connected to the closure element, the guiding device configured to engage in said rear guide track upon rearward movement of the closure element;

a lifting device coupled to the closure element and configured to lift a rear side of the closure element from its closed position, wherein the lifting device includes a guide track for the guiding device, and wherein the guide track of the lifting device connects with the rear guide track during at least a part of the rearward movement of the closure element to allow the guiding device thereof to move between the guide track of the lifting device and the rear guide track; and a height-adjustable, movable element connected to the lifting device and having a forcing mechanism configured to determine a position of the lifting device, wherein the forcing mechanism includes a guiding slide which is provided with a guide curve to be engaged by a guide member connected to the lifting device.

3. The open roof construction according to claim 1, wherein the lifting device is rotatably connected to the rear guide track.

4. An open roof construction for a vehicle having an opening in its fixed roof, comprising:

a stationary part having at least one front guide track extending at least along a part of the roof opening to be attached to the vehicle roof;

at least one closure element which is movably supported by said stationary part and which is adjustable by a driving unit, wherein said closure element is movable between a closed position for closing the roof opening, and an open, rearward position for being at least partially above the roof area behind the roof opening, in which the roof opening is at least partially released, the closure element having a front support at a front side, the front support being connected to the front guide track for guided movement;

a rear guide track mounted to the stationary part at least substantially rearward of the roof opening; and a rear support connected to the closure element at a rear side, the rear support including:

a guiding device connected to the closure element, the guiding device configured to engage in said rear guide track upon rearward movement of the closure element;

a lifting device coupled to the closure element and configured to lift a rear side of the closure element from its closed position, wherein the lifting device includes a guide track for the guiding device, and wherein the guide track of the lifting device connects with the rear guide track during at least a part of the rearward movement of the closure element to allow the guiding device thereof to move between the guide track of the lifting device and the rear guide track, wherein an axis of rotation of the lifting device is arranged substantially at a front end of the rear guide track; and a height-adjustable, movable element connected to the lifting device and having a forcing mechanism configured to determine a position of the lifting device.

5. The open roof construction according to claim 1, wherein the lifting device is rotatable around an axis of rotation which is positioned remote from a front end of the rear guide track.

6. The open roof construction according to claim 1, wherein the guide track in the lifting device extends rearwardly and upwardly in a position when the guide track aligns with the rear guide track.

7. An open roof construction for a vehicle having an opening in its fixed roof, comprising:

a stationary part having at least one front guide track extending at least along a part of the roof opening to be attached to the vehicle roof;

at least one closure element which is movably supported by said stationary part and which is adjustable by a driving unit, wherein said closure element is movable between a closed position for closing the roof opening, and an open, rearward position for being at least partially above the roof area behind the roof opening, in which the roof opening is at least partially released, the closure element having a front support at a front side, the front support being connected to the front guide track for guided movement;

a rear guide track mounted to the stationary part at least substantially rearward of the roof opening; and a rear support connected to the closure element at a rear side, the rear support including:

a guiding device connected to the closure element, the guiding device configured to engage in said rear guide track upon rearward movement of the closure element;

a lifting device coupled to the closure element and configured to lift a rear side of the closure element from its closed position, wherein the lifting device includes a guide track for the guiding device, and wherein the guide track of the lifting device connects with the rear guide track during at least a part of the rearward movement of the closure element to allow the guiding device thereof to move between the guide track of the lifting device and the rear guide track; and a height-adjustable, movable element connected to the lifting device and having a forcing mechanism configured to determine a position of the lifting device; and wherein the front and rear supports of the closure element are driven such that the closure element is moved from the closed position in a first movement to a venting position by mainly a pivoting movement around a pivoting axis near the front support of the closure element, and in a second movement to an open position above the roof area behind the roof opening, the first movement being initiated by the forcing mechanism, the second movement by the front support.

8. The open roof construction according to claim 1, wherein the guiding device is a support fixed to the closure element and includes a guide member engaging the guide tracks.

9. The open roof construction according to claim 1, wherein the guiding device is a support which is pivotally connected to the closure element and includes a guide member engaging the guide tracks.

10. The open roof construction according to claim 1, wherein at least the forcing mechanism, the guiding device, and the rear guide track are arranged such with respect to each other that they are substantially in the same lateral position.

11. The open roof construction according to claim 10, wherein the guide track in the lifting device and the rear guide track include an opening in an upward direction, the guiding device having a width which is more narrow than a width of the opening at least at the position of the opening.

12. The open roof construction according to claim 10, wherein the lifting device is also positioned at the same lateral position as the rear guide track.

13. The open roof construction according to claim 10, wherein the forcing mechanism is positioned mainly below the rear guide track.

14. The open roof construction according to claim 1 wherein the forcing mechanism is positioned relative to the lifting device at an end thereof remote from the rear guide track.

15. An open roof construction for a vehicle having an opening in its fixed roof, comprising:
- a stationary part having at least one front guide track extending at least along a part of the roof opening, the stationary part to be attached to the vehicle roof;
- at least one closure element which is movably supported by said stationary part and which is adjusted by a driving unit, wherein said closure element is movable between a closed position for closing the roof opening, and an open, rearward position for being at least partially above the roof area behind the roof opening, in which the roof opening is at least partially released, the closure element having a front support at a front side,
- the front support being connected to the front guide track for guided movement;
- a rear guide track mounted to the stationary part at least substantially rearward of the roof opening;
- a rear support connected to the closure element at a rear side, the rear support including:
  - a guiding device connected to the closure element for engagement in said rear guide track upon rearward movement of the closure element;
  - a lifting device having a height-adjustable, movable element which has a forcing mechanism determining the position of the lifting device, the forcing mechanism including a guiding slide having a guide track in which a guide member of the lifting device engages, wherein at least the guiding slide of the forcing mechanism, the guiding device, and the rear guide track are arranged such with respect to each other that they are substantially in the same lateral position.

\* \* \* \* \*